US011412290B2

(12) United States Patent
Chu et al.

(10) Patent No.: US 11,412,290 B2
(45) Date of Patent: Aug. 9, 2022

(54) AUDIO, VIDEO, AND VOICE COMMUNICATION PROCESSORS

(71) Applicant: Hewlett-Packard Development Company, L.P., Spring, TX (US)

(72) Inventors: Tao-Sheng Chu, Taipei (TW); Maureen Min-Chaun Lu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 109 days.

(21) Appl. No.: 16/481,766

(22) PCT Filed: Jun. 19, 2017

(86) PCT No.: PCT/US2017/038170
§ 371 (c)(1),
(2) Date: Jul. 29, 2019

(87) PCT Pub. No.: WO2018/236337
PCT Pub. Date: Dec. 27, 2018

(65) Prior Publication Data
US 2020/0112763 A1    Apr. 9, 2020

(51) Int. Cl.
*H04N 21/439* (2011.01)
*H04N 21/426* (2011.01)
*H04N 21/434* (2011.01)
*H04N 21/435* (2011.01)

(52) U.S. Cl.
CPC ..... *H04N 21/439* (2013.01); *H04N 21/42615* (2013.01); *H04N 21/435* (2013.01); *H04N 21/4344* (2013.01)

(58) Field of Classification Search
None
See application file for complete search history.

(56) References Cited

U.S. PATENT DOCUMENTS

| 5,953,396 A | * | 9/1999 | Kong | ................. H04N 21/6187 379/93.12 |
| 7,612,772 B2 | | 11/2009 | Tseng | |
| 8,719,301 B2 | | 5/2014 | Hunt et al. | |
| 2005/0281417 A1 | * | 12/2005 | Toprover | ........... H04N 21/8106 381/104 |

(Continued)

FOREIGN PATENT DOCUMENTS

| CN | 101650580 A | 2/2010 | |
| EP | 2268051 A1 * | 12/2010 | ............ H04M 1/656 |
| WO | WO-WO2016/183763 | 11/2015 | |

OTHER PUBLICATIONS

How to Access a Remote Computer Even if It's Shut Down, Aug. 30, 2013, https://blog.islonline.com/2013/08/30/how-to-access-a-remote-computer-even-if-its-shut-down/.

*Primary Examiner* — Jason K Lin
(74) *Attorney, Agent, or Firm* — Lakshmi Kumaran & Sridharan

(57) ABSTRACT

In an example, an audio, video, and voice communication (AVC) processor includes an audio and video (AV) port to receive audio and video (AV) signals and an audio and voice input/output (I/O) port to communicate with a voice transceiver. The control unit, coupled to the AVC processor, controls the AVC processor to select the received signals and enables the AVC processor to transmit the selected signals to a media and voice playing unit.

15 Claims, 7 Drawing Sheets

(56) References Cited

U.S. PATENT DOCUMENTS

| | | | |
|---|---|---|---|
| 2006/0026293 A1* | 2/2006 | Virdi | H04N 21/6543 709/231 |
| 2007/0074268 A1* | 3/2007 | Pepper | H04N 21/2143 725/136 |
| 2007/0142025 A1* | 6/2007 | Alden | H04M 1/05 455/403 |
| 2007/0153132 A1* | 7/2007 | Jong | H04N 5/268 348/705 |
| 2009/0312078 A1* | 12/2009 | Chen | H04M 1/6016 455/575.6 |
| 2010/0053453 A1* | 3/2010 | Tsai | G06F 3/14 348/705 |
| 2014/0267913 A1 | 9/2014 | An et al. | |
| 2014/0333840 A1* | 11/2014 | Maeda | H04N 21/4184 348/705 |
| 2015/0334218 A1 | 11/2015 | Jacobsen et al. | |
| 2016/0379016 A1* | 12/2016 | Beals | G06K 7/0021 235/441 |
| 2016/0381202 A1 | 12/2016 | Koo et al. | |
| 2017/0060510 A1* | 3/2017 | Yu | G08C 17/02 |
| 2017/0193962 A1* | 7/2017 | Yoon | G06F 3/147 |
| 2018/0063555 A1* | 3/2018 | Raduchel | G06F 9/45533 |

* cited by examiner

AUDIO, VIDEO, AND VOICE COMMUNICATION PROCESSORS

BACKGROUND

Electronic devices generally comprise a computer unit that is used for general computing functions as well as a media and voice playing unit that is used for media and voice playing functions, such as playing audio signals, displaying video signals, playing voice signals, or a combination thereof. An external media and voice source, such as a game console, a set-top box, a media player, a digital television, a microphone, or a mobile phone may be coupled externally to the electronic device to play an external audio, an external video, an external voice, or a combination thereof.

BRIEF DESCRIPTION OF DRAWINGS

The detailed description is described with reference to the accompanying figures. It should be noted that the description and figures are merely examples of the present subject matter and are not meant to represent the subject matter itself.

DETAILED DESCRIPTION

Figure 1:
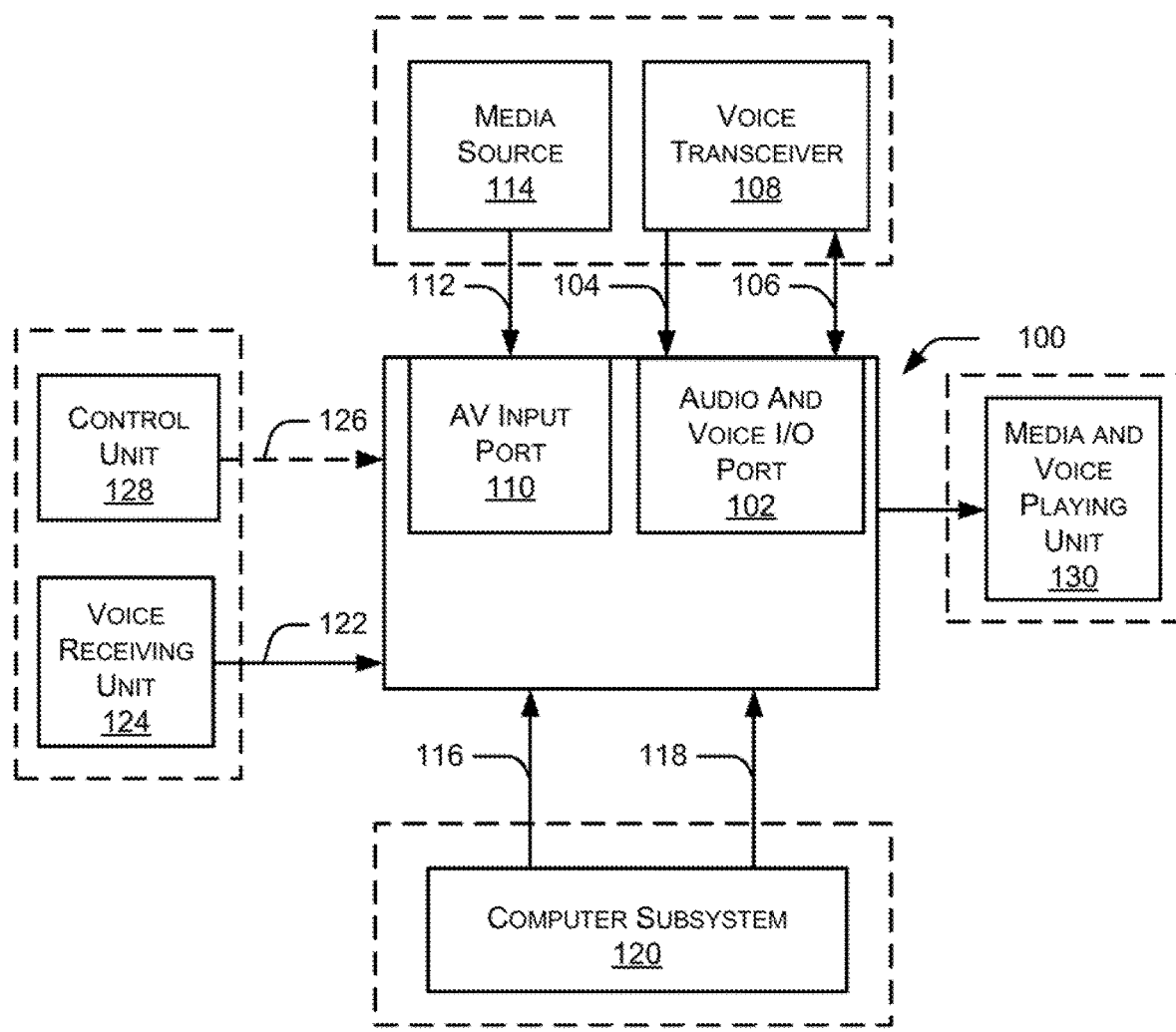
FIG. 1 illustrates a block diagram of an audio, video, and voice communication (AVC) processor that communicates with externally coupled devices, according to an example of the present subject matter.

An electronic device, such as a smart phone, a tablet personal computer (PC), a desktop PC, a laptop PC, a minicomputer, or a notebook may share its media and voice playing unit with external media sources and external voice transceivers via a communication interface. The media and voice playing unit of the electronic device may include components, such as a speaker or a monitor screen for realizing media and voice playing functions. In an example, all-in-one PC, also known as all-in-one desktop, may integrate the computer unit and the media and voice playing unit, eliminating the need of having separate units. The external media sources may be game consoles, set-top boxes, media players, digital televisions (DTVs), digital cameras, smart phones, or devices that may provide access to the media stored on cloud. In one example, the speaker of the electronic device may be used as a wireless speaker to play audio sound wirelessly from an externally connected mobile device. In another example, the electronic device may share a display monitor to display videos or photos stored on an externally connected camera device. In yet another example, a microphone and the speaker of the electronic device may be used as a wireless hands-free speakerphone to handle mobile phone calls.

In the above examples, when a computer unit of the electronic device, i.e., a logic circuitry that performs general computer functions, is dysfunctional or not in operation, the media and voice playing unit may not function independently. In such a case, generally, a user may have to turn on the computer unit, go through boot-up sequences, log-on, and open software applications to use the electronic device as the wireless speaker, the display monitor, or the wireless hands-free speakerphone.

The present subject matter relates to an audio, video, and voice communication (AVC) processor and an electronic device that includes the AVC processor and a computer unit. The electronic device may share its media and voice playing unit with external media sources, while a computer unit of the electronic device is either in an operational state or in a non-operational state. In other words, the operation of the media and voice playing unit may be independent of the operating state of the computer unit. For example, the computer unit in the non-operational state may refer to a state that the computer unit is powered off, the computer unit is in sleep or standby state, the computer unit is suspended, or the computer unit is in a malfunction state. In this way, the user may use the media and voice playing unit of the electronic device as a wireless speaker, a display monitor, or a hands-free speakerphone, irrespective of the state of the computer unit.

According to an example of the present subject matter, the AVC processor may include an audio and video (I/O) port to receive external AV signals and an audio and voice input/output (I/O) port to communicate with an external voice transceiver. The AVC processor may be coupled with a voice receiving unit, a media and voice playing unit, a computer subsystem, and a control unit. Based upon control signals received from the control unit, the AVC processor may select one of the signals received from the audio and voice I/O port and the AV port. The AVC processor may transmit the selected signals to the media and voice playing unit. The AVC processor may operate even when the computer subsystem is non-operational.

According to another example of the present subject matter, the electronic device may further include a voice receiving unit, a media and voice playing unit, and a control unit. The AVC processor may include an audio and video (AV) port to receive external AV signals and an audio and voice input/output (I/O) port to communicate with an external voice transceiver. The control unit may control the AVC processor to select one of the received signals and enable the AVC processor to transmit the selected signals to the media and voice playing unit. The operation of the AVC processor may be independent of the operational state of the computer subsystem. Therefore, when the computer subsystem is in the non-operational state, the AVC processor continues to share media and voice playing unit of the electronic device with the external media sources.

The following detailed description refers to the accompanying drawings. Wherever possible, the same reference numerals are used in the drawings and the description to refer to the same or similar parts. Furthermore, in some figures, various components for which no protection is sought have been illustrated in using dotted lines. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a block diagram of an audio, video, and voice communication (AVC) processor 100 that communicates with externally coupled devices, according to an example of the present subject matter. The AVC processor 100 may be implemented as a microprocessor, a microcomputer, a microcontroller, a digital signal processor, a central processing unit, a state machine, a logic circuit, and/or any device that manipulates signals based on operational instructions. Among other capabilities, the AVC processor 100 may fetch and execute computer-readable instructions stored in a memory. The functions of the AVC processor 100 may be provided through the use of dedicated hardware as well as hardware capable of executing machine readable instructions.

The AVC processor 100 may include input/output (I/O) ports that serve as an interface between the AVC processor 100 and external peripheral(s) or device(s) or processor(s) or controller(s). In computer terms, the I/O ports receive the bytes from the external peripheral(s) for reading them using instructions executed by the processor. Similarly, the I/O ports send the bytes to the external peripheral(s) using instructions executed by the processor.

In an example, the AVC processor 100 may include an audio and voice input/output (I/O) port 102 which may be utilized to establish a connection with a voice transceiver 108. The AVC processor 100 may receive audio signals 104 or voice signals 106 from the voice transceiver 108. In an example, the voice transceiver 108 may be a device that can both transmit and receive the voice signals to and from the AVC processor 100. The voice transceiver 108 may be a cellular phone, a mobile two-way radio, or the like.

In an example, the AVC processor 100 may further include an audio and video (AV) input port 110 to receive AV signals 112 from a media source 114. In an example, the AV signals 112 may be a High Definition Multimedia Interface (HDMI) input.

In an example, the connection of the AVC processor 100 with the voice transceiver 108 and the media source 114, respectively, may be a wired connection or a wireless connection. In the wired connection, the AVC processor 100 and the voice transceiver 108 or the media source 114 may be connected through a cable or a contact terminal. A wireless connection corresponds to a method of pairing the AVC processor 100 with the voice transceiver 108 or the media source 114 by using a wireless protocol supported by both the paired parts. For an example, the wireless protocol may include Bluetooth, Wi-Fi, or Wireless Local Area Network (WLAN).

In an example, the AVC processor 100 may also receive media and voice signals from a computer subsystem 120. The computer subsystem 120 may be considered as a processor separate from the AVC processor 100 and performs general computer functions, such as data inputting/outputting, data manipulation, and data storing. The computer subsystem 120 may be externally coupled to the AVC processor 100. In an example, the coupling between the AVC processor 100 and the computer subsystem 120 may be performed by interconnection networks.

In an example, the AVC processor 100 receives AV signals 116 or voice signals 118 from the computer subsystem 120. Also, the AVC processor 100 may send voice signals (not shown) to the computer subsystem 120, which may be stored in the computer subsystem 120 for later use. In an example, the AV signals 116 may represent the data file formats, such as Audio Video Interleaved (AVI), Moving Picture Experts Group (MPEG), Digital Data Storage (DAT), or the like.

In an example, the AVC processor 100 may receive voice signals 122 from a voice receiving unit 124. The voice receiving unit may be a microphone or the like. In an example, the AVC processor 100 may include an input terminal (not shown) that receives the voice signals 122 from the microphone. The connection between the AVC processor 100 and the microphone may be via cables or wires. The AVC processor 100 may process the voice signals 122 and provide a processed output signal (not shown). The AVC processor 100 may comprise a dynamic range compressor (not shown) to compress the processed output signal.

The AVC processor 100 may also receive control signals 126 from a control unit 128. Based upon the control signals 126, the AVC processor may select the AV signals 112 from the media source 114, the audio signals 104 from the voice transceiver 108, the voice signals 106 from the voice transceiver 108, the AV signals 116 from the computer subsystem 120, or the voice signals 118 from the computer subsystem 120. In an example, the control unit 128 may be a keyboard, a mouse, a joystick, a touchpad, a light pen, a pointing stick, or the like.

Further, the AVC processor 100 may transmit the selected signals to a media and voice playing unit 130, the voice transceiver 108, or a combination thereof. In an example, the AVC processor 100 may select the AV signals 112 from the media source 114 and the media and voice playing unit 130 may play the AV signals 112. In an example, the AVC processor 100 may select the AV signals 116 from the computer subsystem 120 and the media and voice playing unit 130 may play the AV signals 116. In an example, the AVC processor 100 may select the voice signals 106 from the voice transceiver 108 and the media and voice playing unit 130 may play the voice signals 106. In an example, the AVC processor 100 may provide the voice signals 106 to the computer subsystem 120 to store for later use. In an example, the AVC processor 100 may select the voice signals 122 from the voice receiving unit 124 and provide further to the voice transceiver 108.

In an example, the media and voice playing unit 130 may include a video output unit to display video signals and an audio and voice output unit to play audio signals or voice signals. Though shown as a single unit, it will be understood that in other implementations, the video output unit and the audio and voice output unit may be implemented as separate units.

As shown in FIG. 1, function of the AVC processor 100 may be made independent of the computer subsystem 120 so that the media and voice playing unit 130, coupled to the AVC processor 100, may be accessed by the media source 114 and the voice transceiver 108, even if the computer subsystem 120 is not in operation or dysfunctional.

Figure 2:
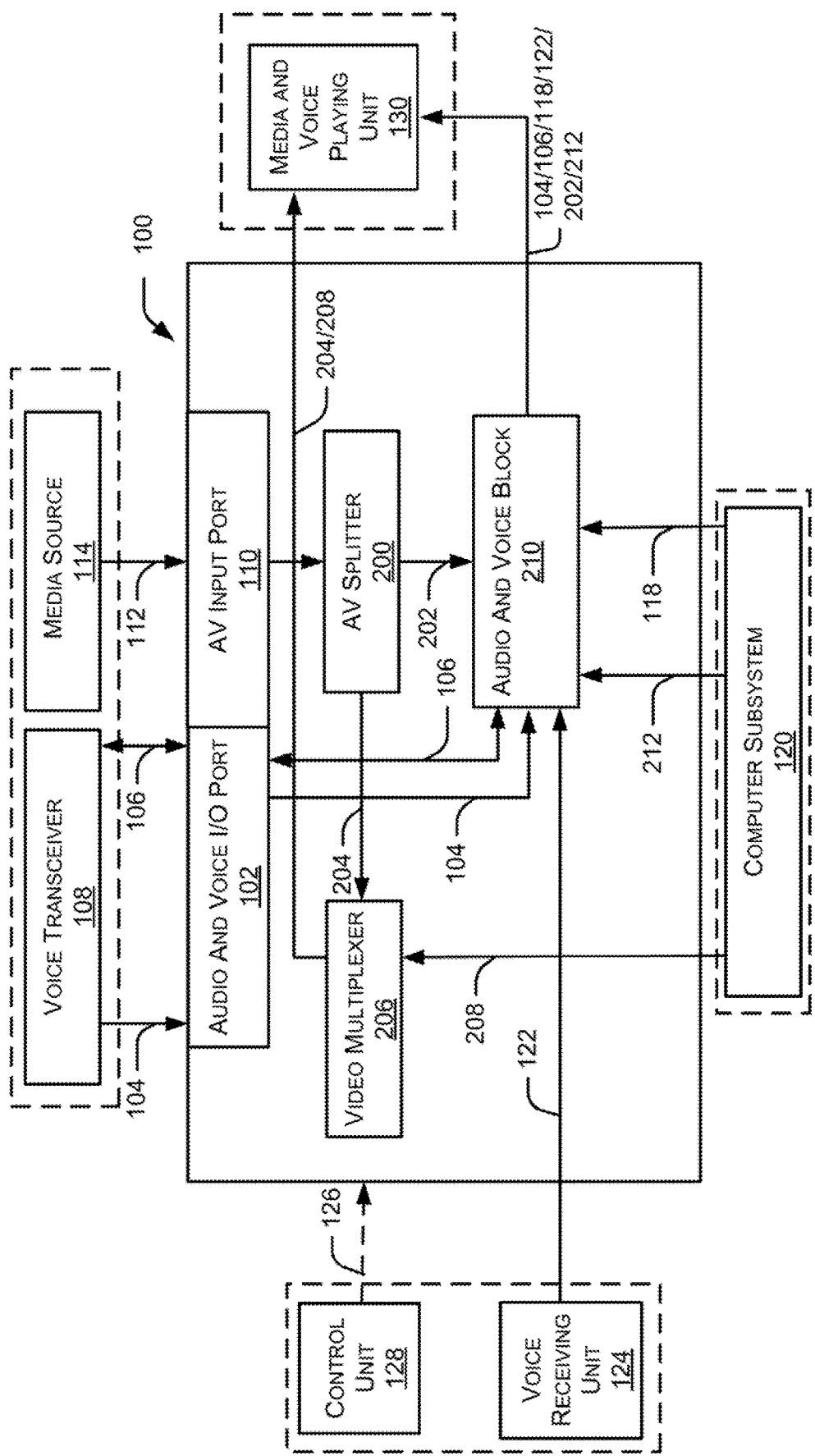
FIG. 2 illustrates a block diagram of an audio, video, and voice communication (AVC) processor including components for processing audio signals, voice signals, and video signals, according to an example of the present subject matter.

FIG. 2 illustrates a block diagram of the AVC processor 100 including components for processing audio signals, voice signals, and video signals, according to an example of the present subject matter.

As previously described, the AVC processor 100 may include the audio and voice I/O port 102 to communicate with the voice transceiver 108 and the AV input port 110 to receive the AV signals 112 from the media source 114. In an example, the AVC processor 100 may include a plurality of AV input ports to connect a plurality of media sources. Further, the AVC processor 100 may include an audio and video (AV) splitter 200, a video multiplexer 206, and an audio and voice block 210.

In an operation, the AV signals 112 received at the AV input port 110 may be provided to the AV splitter 200. The AV splitter 200 splits the AV signals 112 into audio signals 202 and video signals 204. The AV splitter 200 may provide the video signals 204 to the video multiplexer 206. The video multiplexer 206 may also receive video signals 208 from the computer subsystem 120. As known in the art, the video multiplexer 206 may be considered as a multiple input-single output switch. Therefore, the video multiplexer 206 may select one of several input video signals and forward the selected input video signal into a single output line. The selection of the input video signals may be based on the control signals 126 sent from the control unit 128. In an example, the selected video signals may be one of the video signals 204 from the media source 114 and the video signals 208 from the computer subsystem 120. The selected video signals 204/208 may be displayed on the media and voice playing unit 130. In an example, the media and voice playing unit 130 may be a monitor, a projector, or the like.

Further, the AV splitter 200 may provide the audio signals 202 to the audio and voice block 210. The audio and voice block 210 may also receive the voice signals 118 from the computer subsystem 120, the voice signals 106 from the voice transceiver 108, or the voice signals 122 from the voice receiving unit 124. The details of the audio and voice block 210 are provided hereinafter with respect to FIG. 3.

Figure 3:
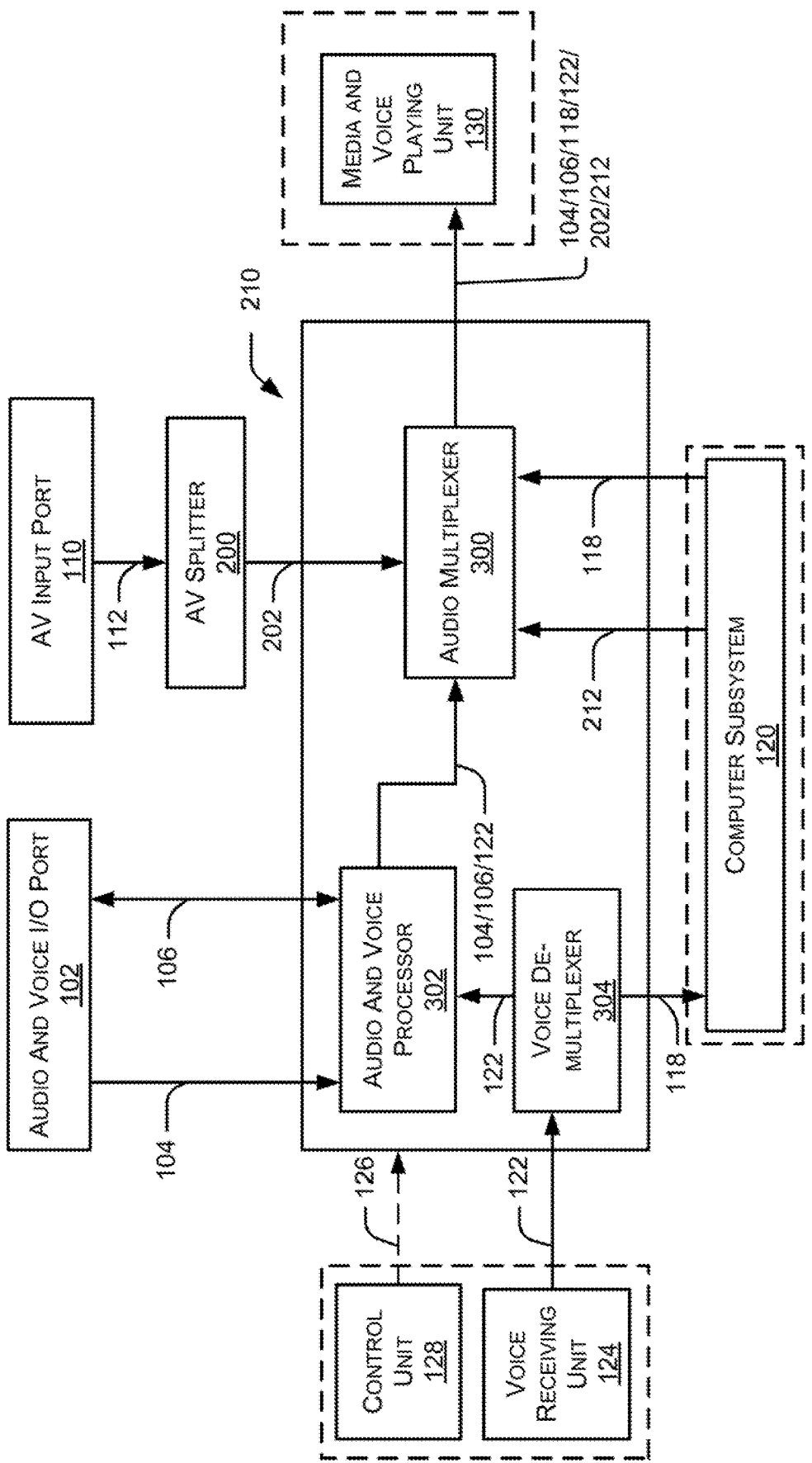
FIG. 3 illustrates a block diagram of an audio and voice block of an audio, video, and voice communication (AVC) processor for processing audio signals and voice signals, according to an example of the present subject matter.

FIG. 3 illustrates a block diagram of the audio and voice block 210 of the AVC processor 100 for processing audio signals and voice signals, according to an example of the present subject matter. The audio and voice block 210 may include an audio multiplexer 300, an audio and voice processor 302, and a voice de-multiplexer 304.

The voice de-multiplexer 304 may receive voice signals 122 from the voice receiving unit 124 coupled to the audio and voice block 210 of the AVC processor 100. The voice de-multiplexer 304 may be considered as a single-input, multiple-output switch. Therefore, the voice de-multiplexer 304 may receive a single input and send it to one of many outputs. The selection of the output voice signals may be based on the control signals 126 sent from the control unit 128. In an example, the selected output voice signals may be one of the voice signals 122 and the voice signals 118. The voice signals 122 may further be provided to the voice transceiver 108 via the audio and voice I/O port 102 or to the media and voice playing unit 130 via the audio multiplexer 300. The voice signals 118 may be provided to the computer subsystem 120 for later use.

The audio and voice processor 302 may receive audio signals 104 and the voice signals 106 from the voice transceiver 108 via the audio and voice I/O port 102. The audio and voice processor 302 may also receive the voice signals 122 from the voice receiving unit 124 via the voice de-multiplexer 304.

The audio multiplexer 300 may receive the voice signals 106/122 or the audio signals 104 from the audio and voice processor 302. The audio multiplexer 300 may also receive the audio signals 202 from the AV splitter 200 and the audio signals 212 from the computer subsystem 120. The audio multiplexer may receive the voice signals 118 that are already stored in the computer subsystem 120. The audio multiplexer 300 may be considered as a multiple input-single output switch. Therefore, the audio multiplexer 300 may select one of several input audio and voice signals and output the selected input audio and voice signal into a single output line. The selection of the output audio and voice signals may be based on the control signals 126 from the control unit 128. The selected audio and voice signals may be played on the media and voice playing unit 130.

Figure 4:
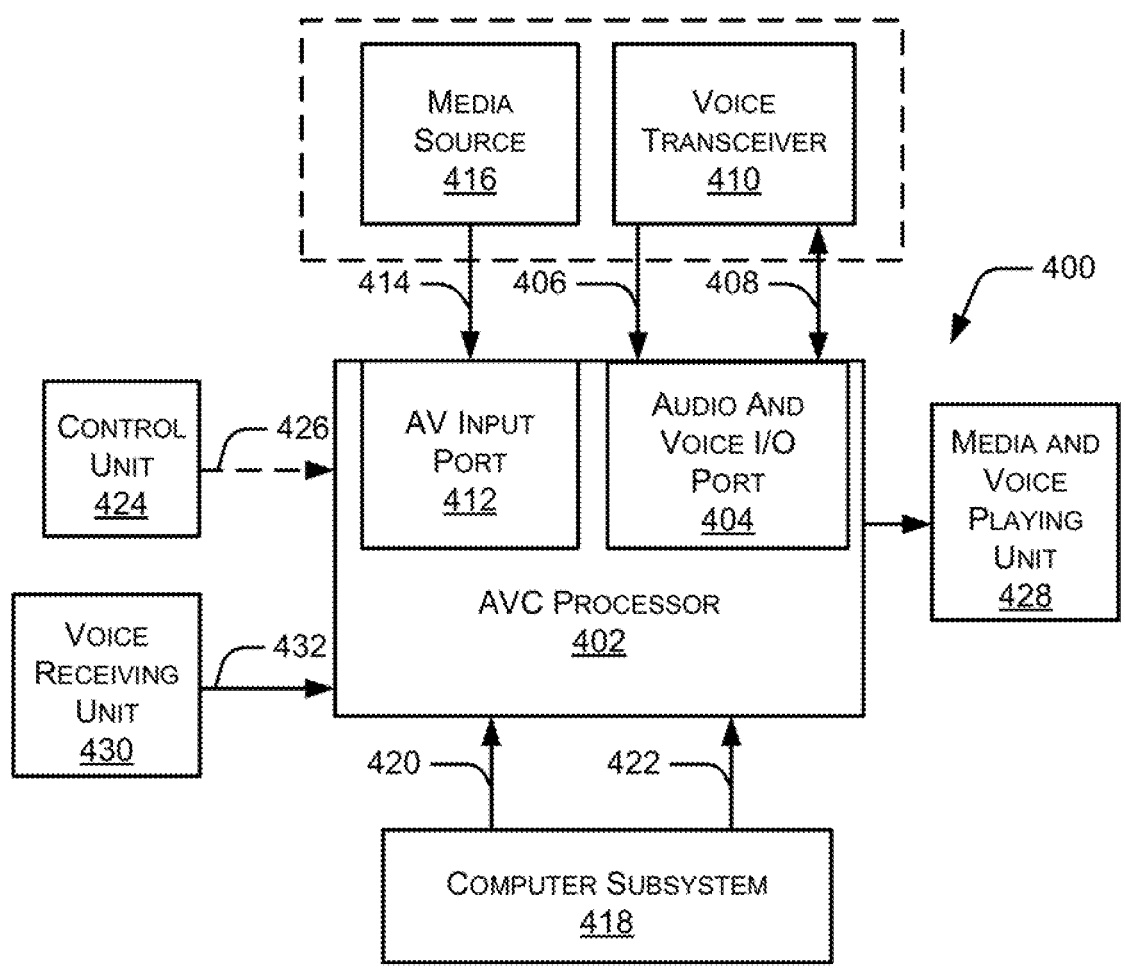
FIG. 4 illustrates a block diagram of an electronic device for playing voice or audio and video signals from a voice transceiver or a media source, according to an example of the present subject matter.

FIG. 4 illustrates a block diagram of an electronic device 400 for playing voice or audio and video (AV) signals from a voice transceiver or a media source, according to an example of the present subject matter. The electronic device 400 may include an audio, video, and voice communication (AVC) processor 402, a computer subsystem 418, a media and voice playing unit 428, a voice receiving unit 430, and a control unit 424. Further, the electronic device 400 may also include interface(s), memory, other modules, and system data, which are not shown in FIG. 4.

The AVC processor 402 and the computer subsystem 418 may be implemented as microprocessors, microcomputers, microcontrollers, digital signal processors, central processing units, state machines, logic circuitries, and/or any devices that manipulate signals based on operational instructions. Among other capabilities, the AVC processor 402 and the computer subsystem 418 may fetch and execute computer-readable instructions stored in a memory. The functions of the AVC processor 402 and the computer subsystem 418 may be provided through the use of dedicated hardware as well as hardware capable of executing machine readable instructions.

The interface(s) may include a variety of machine readable instructions-based interfaces and hardware interfaces that allow interaction with a user and with other communication and computing devices, such as network entities, web servers, and external repositories, and peripheral devices. The memory may include any non-transitory computer-readable medium including, for example, volatile memory (e.g., RAM), and/or non-volatile memory (e.g., EPROM, flash memory, etc.). The memory may also be an external memory unit, such as a flash drive, a compact disk drive, an external hard disk drive, or the like.

The system data may serve as a repository for storing data that may be fetched, processed, received, or created by the AVC processor 402 and the computer subsystem 418 or received from connected computing systems and storage devices.

To distinguish from external media sources such as a media source 416 and a voice transceiver 410, the computer subsystem 418 may be considered as an internal media and voice source. The computer subsystem 418 may send AV signals 420 and voice signals 422 to the AVC processor 402. Also, the computer subsystem 418 may receive the voice signals (not shown) from the AVC processor 402, which may be stored in the computer subsystem 418 for a later use.

In an example, the voice receiving unit 430 may provide voice signals to the AVC processor 402. The voice receiving unit may be a microphone or the like.

The control unit 424 may control the AVC processor 402 to select AV signals 414/420, audio signals 406, or voice signals 408/422. Further, the control unit 424 enables the AVC processor 402 to transmit the selected AV signals 414/420, the audio signals 406, or the voice signals 408/422 to the media and voice playing unit 428. The control unit 424 also enables the AVC processor 402 to transmit the selected voice signals 408 to the voice transceiver 410. The control unit 426 may be a keyboard, a mouse, a joystick, a touchpad, a light pen, a pointing stick, or the like.

In an example, the media source 416 may be a media player, a game console, a set-top box, a digital television, a digital camera, a smart phone, or any other electronic device distinct from the electronic device 400. In an example, the voice transceiver 410 may be a cellular phone, a mobile two-way radio, or any other electronic communication device distinct from the electronic device 400 and the media source 416.

As shown in FIG. 4, the electronic device 400 may be designed to function as a media and voice playing unit 428 and the voice receiving unit 430 for the media source 416 and the voice transceiver 410 that are connected externally to the electronic device 400, when the computer subsystem 418 of the electronic device 400 is not in operation.

Figure 5:
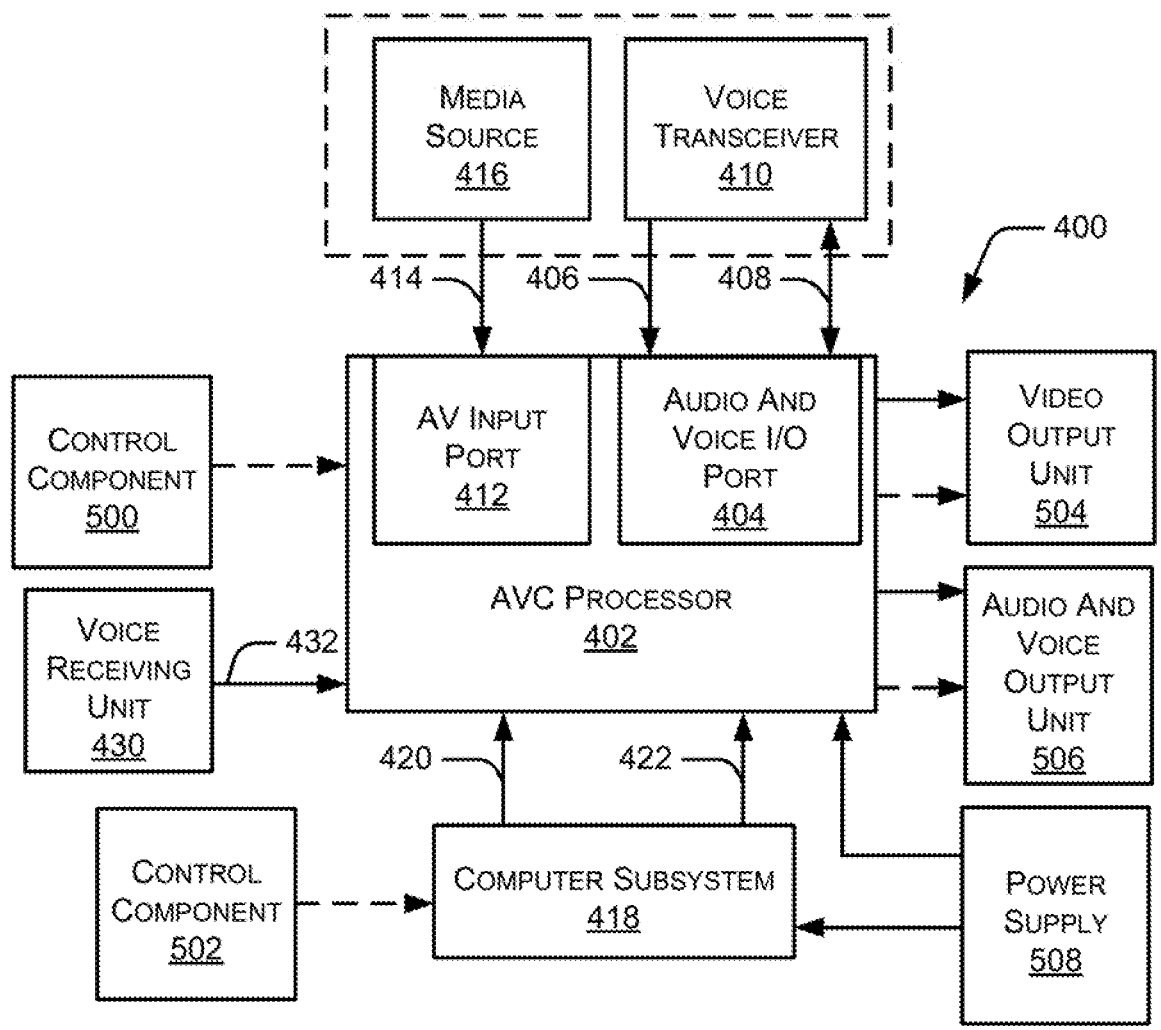
FIG. 5 illustrates a block diagram of an electronic device including units for rendering audio, voice, and video outputs, and control components for controlling the units, according to an example of the present subject matter.

FIG. 5 illustrates a block diagram of the electronic device 400 including units for rendering audio, voice, and video outputs, and control components for controlling the units, according to an example of the present subject matter. The electronic device 400 may include the AVC processor 402, the computer subsystem 418, a video output unit 504, an audio and voice output unit 506, the voice receiving unit 430, a control component 500 for the AVC processor 402, a control component 502 for the computer subsystem 418, and a power supply 508.

The control component 500 for the AVC processor 402 may be coupled to the AVC processor 402. In an example, the control component 500 for the AVC processor 402 may instruct the AVC processor 402 to select the AV signals 414 from the media source 416 via an AV input port 412. In an example, the control component 500 for the AVC processor 402 may instruct the AVC processor 402 to select the voice signals 408 or the audio signals 406 from the voice transceiver 410 via an audio and voice input/output (I/O) port 404. In an example, the control component 500 for the AVC processor 402 may instruct the AVC processor 402 to select the voice signals 432 from the voice receiving unit 430. In an example, the control component 500 for the AVC processor 402 may instruct the AVC processor 402 to send the voice signals 408 to the voice transceiver 410. The control component 500 for the AVC processor 402 may control the AVC processor 402 when the computer subsystem 418 is in the operational state or not in the operational state.

The control component 502 for the computer subsystem 418 may be coupled to the computer subsystem 418. In an example, the control component 502 for the computer subsystem 418 may instruct the AVC processor 402 to select the AV signals 420 or the voice signals 422 from the computer subsystem 418. In an example, the control component 502 for the computer subsystem 418 may instruct the AVC processor 402 to send the voice signals (not shown) to the computer subsystem 418. The control component 502 for the computer subsystem 418 may not operate when the computer subsystem 418 is not in the operational state.

The control component 500 for the AVC processor 402 and the control component 502 for the computer subsystem 418 may adjust audio parameters of the audio and voice output unit 506. In an example, the audio parameters may include an audio volume value, an audio mute status, or the like. The audio volume level of the audio and voice output unit 506 may be scaled up or down depending upon the choice of a user. Also, the audio mute status of the audio and voice output unit 506 may be switched between mute (audio off) and not mute (audio on). Further, the control component 500 for the AVC processor 402 and the control component 502 for the computer subsystem 418 may adjust video parameters of the video output unit 504. In an example, the video parameters may include brightness value, contrast value, or the like.

The audio and voice output unit 506 may be an electro-mechanical device which produces sound. In an example, the audio and voice output device 506 may be a woofer speaker, which is a loudspeaker designed to produce low frequency sounds. In an example, the audio and voice output unit 506 may be a tweeter speaker, which is loudspeaker designed to produce high audio frequencies.

The power supply 508 may provide power to the AVC processor 402, the computer subsystem 418, and other parts of the electronic device 400. In an example, the AVC processor 402 and the computer subsystem 418 may get power input from the power supply 508 separately to ensure that the power state of the AVC processor 402 may not get affected by the power state of the computer subsystem 418. In an example, when the computer subsystem 418 is not in the operational state, the AVC processor 402 may be in the operational state to play the AV signals 414 from the media source 416 on the video output unit 504 and the audio and voice output unit 506. In an example, when the computer subsystem 418 is not in the operational state, the AVC processor 402 may be in the operational state to play the audio signals 406 and the voice signals 408 from the voice transceiver 410.

Figure 6:
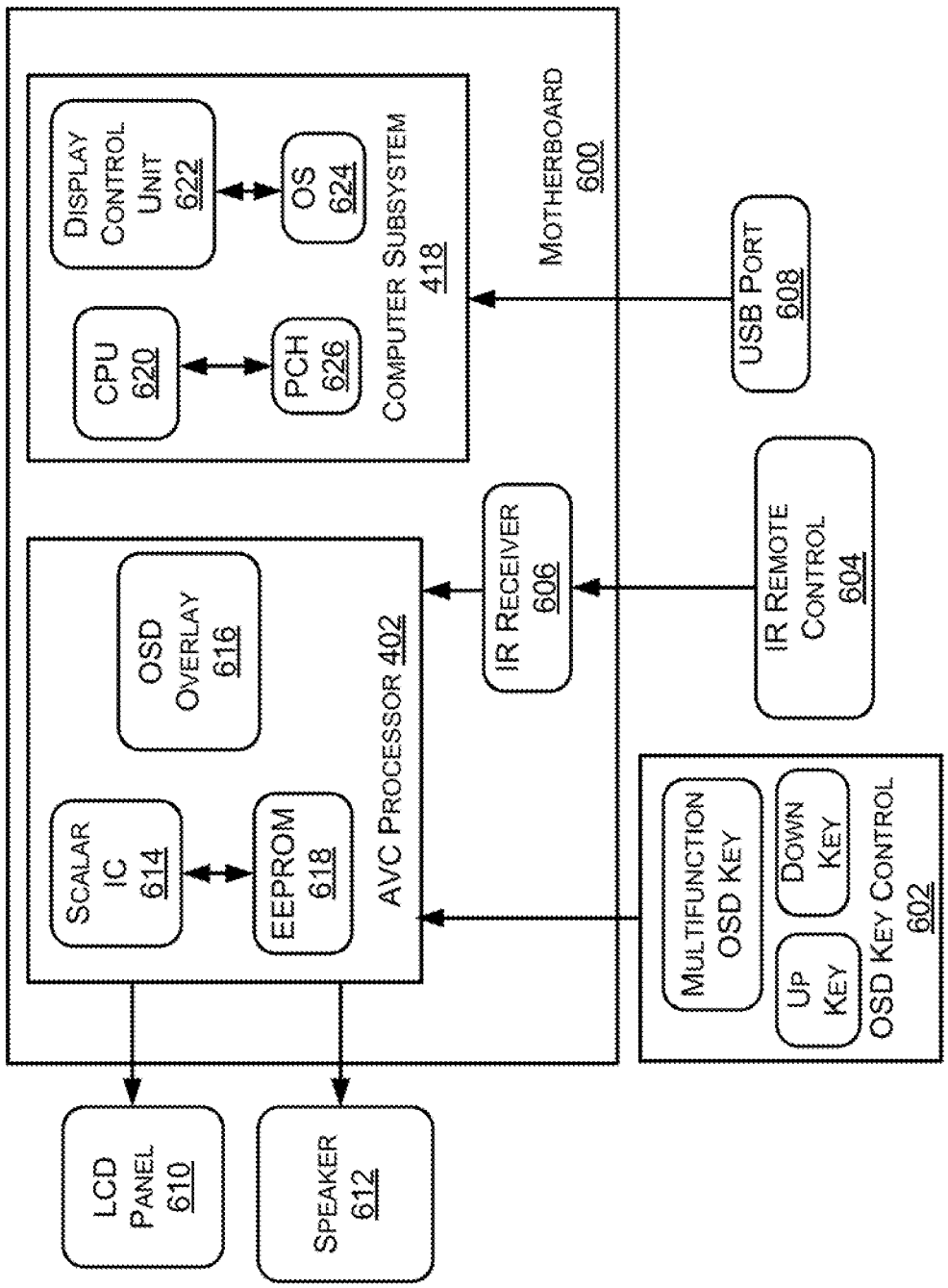
FIG. 6 illustrates a block diagram of an electronic device including control components for instructing an audio, video, and voice communication (AVC) processor and a computer subsystem, according to an example of the present subject matter.

FIG. 6 illustrates a block diagram of the electronic device 400 including control components for instructing the AVC processor 402 and the computer subsystem 418, according to an example of the present subject matter. In an example, a motherboard 600 of the electronic device 400 may include the AVC processor 402, the computer subsystem 418, an on-screen display (OSD) key control 602, an infra-red (IR) remote control 604, an IR receiver 606, a universal serial bus (USB) port 608, a liquid crystal display (LCD) panel 610, and a speaker 612.

The AVC processor 402 may include a scalar integrated circuit (IC) 614, an OSD overlay 616, and an electrically erasable programmable read-only memory (EEPROM) 618. The scalar IC 614 may provide AV switching capabilities, and may be found inside consumer electronic devices such as televisions, video game consoles, digital video disc (DVD) players, and Blu-ray disc players, and may also be found in other AV equipment, such as video editing and television broadcasting equipment. The scalar IC 614 may further include a voltage converter, an audio out port, a display converter, a general-purpose input/output (GPIO), an HDMI receiver. The OSD overlay 616 may be a software module for rendering the OSD key control 602 to a user.

In an example, the computer subsystem 418 may include a Central Processing Unit (CPU) 620, a display control unit 622, an Operating System (OS) 624, and a Platform Controller Hub (PCH) 626. The display control unit 622 may be a software module, where the instructions are executable by the CPU 620 for controlling audio/voice and/or video parameters when the computer subsystem 418 is in the operational state. In an example, the PCH 626 may be similar to a south bridge and manages the I/O functions of the south bridge. The PCH 626 is connected to the CPU 620 via a direct media interface (DMI).

The OSD key control 602 may include a multi-function OSD key, an up key, and a down key. The OSD key control 602 may send control signals to the AVC processor 402. Specifically, the OSD key control 602 may be used to select either the voice transceiver 410 or the media source 416, and adjust audio parameters and/or video parameters of media playing units that are connected to the AVC processor 402.

The IR receiver 606 may receive control signals from the IR remote control 604 and send the control signals to the scalar IC 614. Generally, remote controls are electronic devices that are used to operate devices, such as televisions, DVD players, or other home appliances wirelessly from a distance. Commonly used consumer infrared devices send digitally coded pulses of infrared radiation to control functions such as power, volume, tuning, temperature set point, fan speed, or other features. In an example, the remote control may also include Bluetooth connectivity, motion sensor-enabled capabilities, and voice control.

The OSD key control 602, the IR remote control 604, and the USB port 608 may be used by the user to select either the voice transceiver 410 or the media source 416 as an input for the media and voice playing unit 428 of the electronic device 400. The media and voice playing unit 428 may include the LCD panel 610 and the speaker 612.

Further, the OSD key control 602, the IR remote control 604, and the USB port 608 may be used to adjust audio/voice and video parameters of the media and voice playing unit, such as audio volume of the speaker 612 or brightness of the LCD panel 610. In an example, the control component 500 for the AVC processor 402 may include the OSD key control 602 and the IR remote control 604, which can work when the computer subsystem 418 is either in the operational state or not in the operational state. The control component 502 for the computer subsystem 418 may include the USB port 608, which can work only when the computer subsystem 418 is in the operational state.

Figure 7:
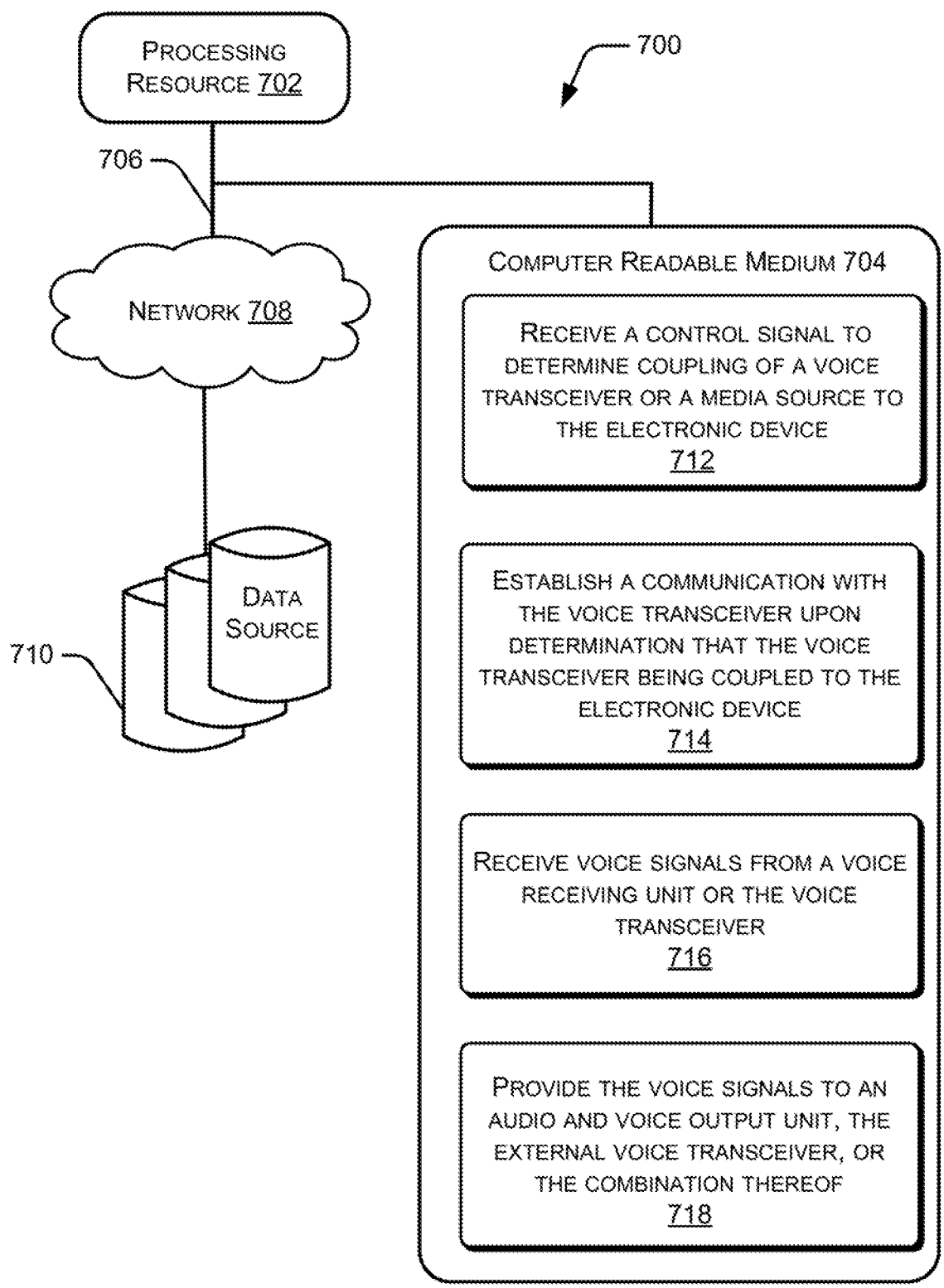
FIG. 7 illustrates a network environment for processing audio signals, video signals, and voice signals, according to an example of the present subject matter.

FIG. 7 illustrates a network environment 700, according to an example of the present subject matter. The network environment 700 includes processing resource(s) or processor(s) 702 of a network entity communicatively coupled to a non-transitory computer readable medium 704 through a communication link 706. In an example, the processor(s) 702 may have one or more processing resources for fetching and executing computer-readable instructions from the non-transitory computer readable medium 704. The processor(s) 702 may be a processor of a network entity in the network environment 700.

The non-transitory computer readable medium 704 can be, for example, an internal memory device or an external memory device. In an example implementation, the communication link 706 may be a direct communication link, such as any memory read/write interface. In another example implementation, the communication link 706 may be an indirect communication link, such as a network interface. In such a case, the processor(s) 702 can access the non-transitory computer readable medium 704 through a network 708. The network may be a single network or a combination of multiple networks and may use a variety of different communication protocols.

The processor(s) 702 and the non-transitory computer readable medium 704 may also be communicatively coupled to data source 710 over the network. The data source 710 can include, for example, source devices and destination devices.

In an example implementation, the non-transitory computer readable medium 704 includes a set of computer readable instructions to control an electronic device, such as the electronic device 400. The set of computer readable instructions can be accessed by the processor(s) 702 through the communication link 706 and subsequently executed to perform acts to control the electronic device.

Referring to FIG. 7, in an example, the non-transitory computer readable medium 704 includes instructions 712 that cause the processor(s) 702 to receive a control signal from a control unit to determine coupling of a voice transceiver or a media source to the electronic device. The voice transceiver and the media source may be coupled externally to the electronic device;

The non-transitory computer readable medium 704 includes instructions 714 that cause the processor(s) 702 to establish a communication with the voice transceiver when the control signal represents the voice transceiver.

Further, the non-transitory computer readable medium 704 includes instructions 716 that cause the processor(s) 702 to receive voice signals from a voice receiving unit or the voice transceiver.

The non-transitory computer readable medium 704 includes instructions 718 that cause the processor(s) 702 to provide the received voice signals to an audio and voice output unit, the voice transceiver, or the combination thereof.

In an example, the non-transitory computer readable medium 704 includes instructions that cause the processor(s) 702 to receive control signals from a control unit and transmit the received control signals to the audio and voice output unit, a video output unit, or a combination thereof.

Although implementations of systems and methods for verifying functionality restrictions of a computing device have been described in language specific to structural features and/or methods, it is to be understood that the present subject matter is not necessarily limited to the specific features or methods described. Rather, the specific features and methods are disclosed and explained as example implementations.

What is claimed:

1. An electronic device comprising:
   a circuit board;
   a computer subsystem on the circuit board and comprising
      a central processing unit (CPU) and an operating system;
   a media and voice playing unit; and
   an audio, video, and voice communication (AVC) processor on the circuit board and separate from the computer subsystem, the AVC processor comprising:
      an audio and voice input/output (I/O) port to receive audio signals and voice signals from a voice transceiver, and
      an audio and video (AV) input port to receive AV signals from a media source that is external of the electronic device in which the computer subsystem and the AVC processor are contained;
   wherein the AVC processor is to:
      receive AV signals or voice signals from the computer subsystem,
      receive voice signals from a voice receiving unit,
      select from among the AV signals from the media source, the audio signals from the voice transceiver, the voice signals from the voice transceiver, the AV signals from the computer subsystem, the voice signals from the voice receiving unit, or the voice signals from the computer subsystem, based upon control signals from a control unit, the selecting to produce selected signals, and
      transmit the selected signals to the media and voice playing unit for presentation by the media and voice playing unit while the computer subsystem is in a power off state or a sleep state.

2. The electronic device of claim 1, wherein the AVC processor comprises an AV splitter to split the AV signals from the media source into audio signals of the media source and video signals of the media source.

3. The electronic device of claim 2, wherein the AVC processor comprises a video multiplexer to:
receive the video signals of the media source, video signals of the computer subsystem, and the control signals from the control unit, and
transmit the video signals of the media source or the video signals of the computer subsystem to the media and voice playing unit, based upon the control signals from the control unit.

4. The electronic device of claim 2, wherein the AVC processor comprises an audio and voice block to:
receive the audio signals of the media source from the AV splitter, the voice signals from the audio and voice I/O port, the voice signals from the computer subsystem, audio signals from the computer subsystem, and the control signals from the control unit, and
transmit the audio signals of the media source from the AV splitter, the voice signals from the audio and voice I/O port, the voice signals from the computer subsystem, or the audio signals from the computer subsystem to the media and voice playing unit, the voice transceiver, or a combination thereof, based upon the control signals from the control unit.

5. The electronic device of claim 4, wherein the audio and voice block comprises:
an audio multiplexer to:
receive voice signals and audio signals from an audio and voice processor, the AV splitter, and the computer subsystem,
select the voice signals from the audio and voice processor, the voice signals from the computer subsystem, the audio signals from the computer subsystem, the audio signals from the AV splitter, or a combination thereof, based upon the control signals from the control unit, wherein the selecting by the audio multiplexer is to produce further selected signals, and
transmit the further selected signals to the media and voice playing unit; and
a voice de-multiplexer to:
receive the voice signals from the voice receiving unit, and
transmit the voice signals from the voice receiving unit to the audio and voice processor or the computer subsystem, based upon the control signals from the control unit.

6. An electronic device comprising:
a circuit board;
an audio, video, and voice communication (AVC) processor on the circuit board and comprising:
an audio and voice input/output (I/O) port to receive audio signals and voice signals from a voice transceiver, and
an audio and video (AV) input port to receive AV signals from a media source that is external of the electronic device;
a computer subsystem on the circuit board and comprising a central processing unit (CPU) and an operating system, wherein the computer subsystem is to send AV signals or voice signals to the AVC processor, wherein the AVC processor is separate from the computer subsystem;
a controller to instruct the AVC processor to select from among the AV signals from the media source, the audio signals from the voice transceiver, or the voice signals from the voice transceiver, wherein the selecting by the AVC processor is to produce selected signals; and
a media and voice playing unit to output the selected signals while the computer subsystem is in a power off state or a sleep state.

7. The electronic device of claim 6, wherein the controller comprises a control component for the AVC processor, wherein the control component for the AVC processor is to instruct the AVC processor to select from among the AV signals from the media source, the audio signals from the voice transceiver, or the voice signals from the voice transceiver.

8. The electronic device of claim 6, wherein the controller comprises a control component for the computer subsystem, wherein the control component for the computer subsystem is to instruct the AVC processor to select from among the AV signals or the voice signals from the computer subsystem when the computer subsystem is powered on.

9. The electronic device of claim 6, wherein the media and voice playing unit comprises:
a display to display video signals; and
a speaker to play audio and voice signals.

10. The electronic device of claim 9, wherein the controller is to adjust audio and voice parameters of the speaker and adjust video parameters of the display.

11. The electronic device of claim 6, comprising a power supply to supply power to the AVC processor or the computer subsystem, or a combination thereof.

12. The electronic device of claim 7, wherein the control component for the AVC processor comprises an on-screen display (OSD) key control to send control signals to the AVC processor.

13. A non-transitory computer-readable medium comprising instructions that when executed cause a first processor of an electronic device to:
receive, at the first processor on a circuit board of the electronic device, a control signal to determine coupling of a voice transceiver or a media source to the electronic device, the voice transceiver and the media source being external of the electronic device;
establish a communication with the voice transceiver;
receive voice signals from a voice receiving unit of the electronic device or the voice transceiver; and
provide, from the first processor on the circuit board, the voice signals to an audio and voice output unit for presentation by the audio and voice output unit while a computer subsystem on the circuit board is in a power off state or a sleep state, wherein the computer subsystem is contained in the electronic device with the first processor and comprises a central processing unit (CPU) and an operating system, and the computer subsystem is separate from the first processor.

14. The non-transitory computer-readable medium of claim 13, wherein the instructions when executed cause the first processor of the electronic device to:
receive control signals from a control unit; and
transmit the control signals to the audio and voice output unit, a video output unit, or a combination thereof.

15. The electronic device of claim 1, wherein the media and voice playing unit comprises a display and a speaker.

* * * * *